Sept. 22, 1970     W. C. EDDY, JR     3,530,297
METHOD AND APPARATUS FOR DETERMINING EXCESS
TEMPERATURE OF A MACHINE COMPONENT BY THE
USE OF AN INERT RADIOACTIVE GAS
Filed Aug. 8, 1966
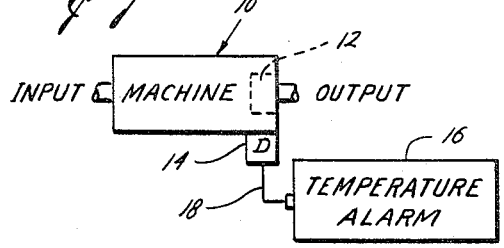
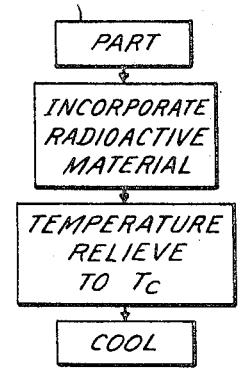
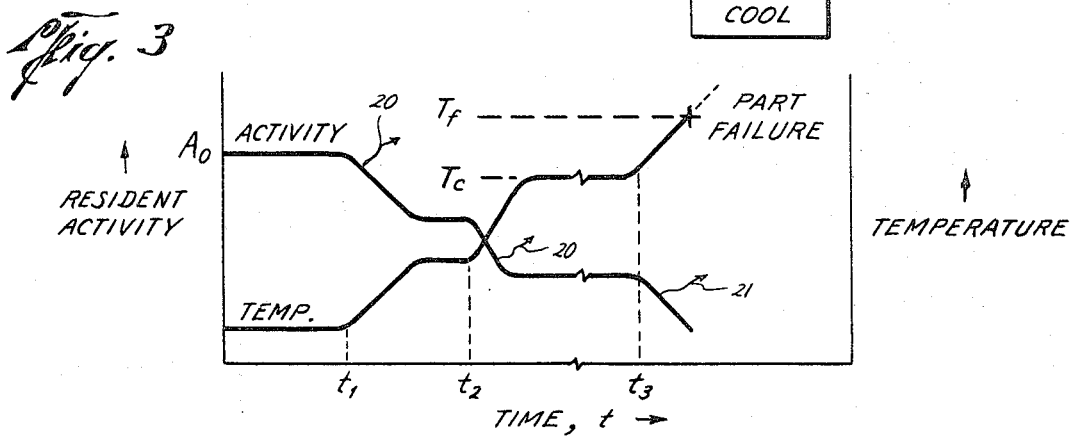
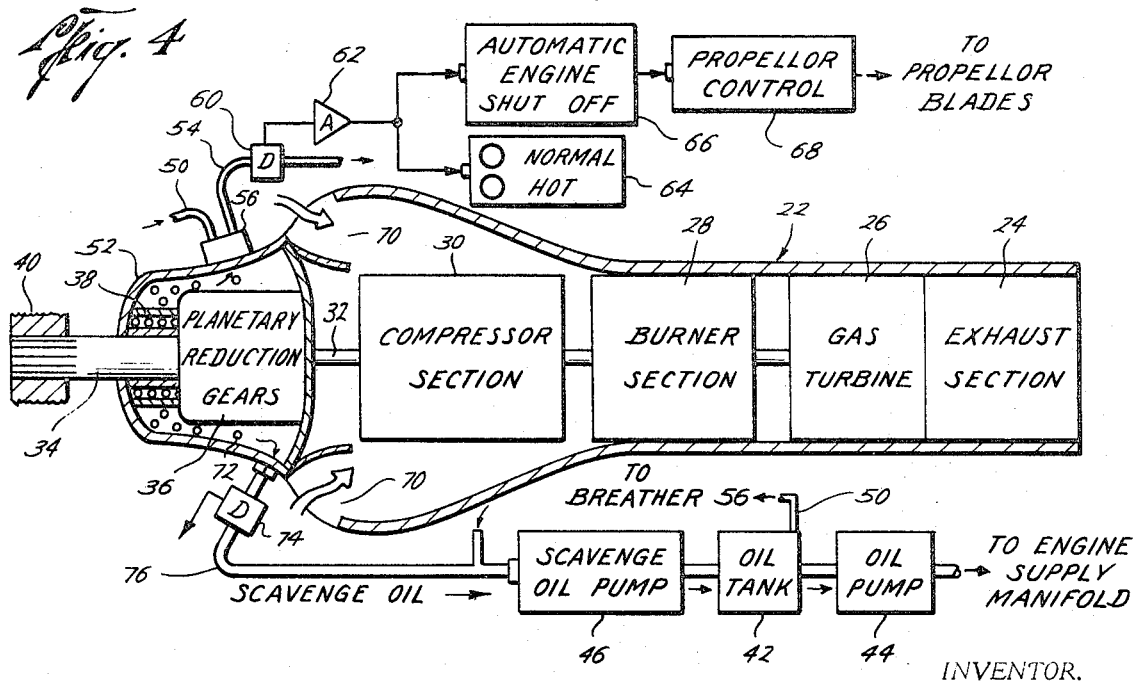
INVENTOR.
William C. Eddy, Jr.
BY
James J. O'Reilly
AGENT United States Patent Office 3,530,297
Patented Sept. 22, 1970

3,530,297
METHOD AND APPARATUS FOR DETERMINING EXCESS TEMPERATURE OF A MACHINE COMPONENT BY THE USE OF AN INERT RADIOACTIVE GAS
William C. Eddy, Jr., Columbus, Ohio, assignor to Industrial Nucleonics Corporation, a corporation of Ohio
Filed Aug. 8, 1966, Ser. No. 571,120
Int. Cl. G01f 1/16
U.S. Cl. 250—83.3       19 Claims

ABSTRACT OF THE DISCLOSURE

A method and apparatus for detecting when a component part within a machine is operated at a temperature in excess of a predetermined maximum safe temperature includes incorporating an inert radioactive gas such as Kr 85 interstitially within one or more selected parts, preheating the treated parts to the predetermined temperature, the operation above which may cause the part to fail, to release a quantity of the radioactive gas until no further gas is released at or below that temperature, installing the treated parts within the machine, detecting the presence of released radioactive gas to indicate that the temperature of a part has subsequently exceeded the predetermined temperature, and indicating or signalling that the safe temperature of a part has been exceeded.

The present invention relates generally to safety devices for machinery and, more particularly, to a novel method and means for protecting a machine from damage caused by excessive operating temperatures of one or more component parts thereof.

BACKGROUND OF THE PRESENT INVENTION

In the past, it has been extremely difficult to determine when a machine is on the verge of a breakdown due to failure of a critical part. Very often failure of a component such as a bearing precipitates a chain reaction which causes damage to other machine parts which results in complete machine breakdown. Since a component usually fails because of excessive wear or physical deterioration, its impending failure is accompanied by a rise in its temperature. Eventually, its temperature reaches the point where the component completely fails.

Thermocouples and thermoelectric sensors have been employed to detect an abnormal rise in operating temperature. These devices rely on heat conducted from the part being monitored so they usually are located directly on the part. With this system, it becomes very expensive to monitor a large number of components; failure to monitor any one part in the interest of cost reduction may result in total machine loss should the excepted part fail. Those systems which monitor the operating temperature of the machine are undesirable because the temperature of a bearing in the heart of the machine may be well in excess of the overall machine temperature and on the verge of incipient failure. Also, it has been difficult to install a termoelectric device on a bearing which moves during the operation of the machine. Electrical wires must be connected to the device and these entangle with shafts or other rotating members making instrumentation difficult. These thermoelectric devices are also characterized by excessively long thermal lags which cannot be tolerated when failure of a high performance engine must be detected within several seconds.

BRIEF DESCRIPTION OF THE PRESENT INVENTION

To overcome these disadvantages, I precondition each critical part by incorporating into its surface a radioactive material through a technique which causes the atoms of the radioactive material to become lodged interstitially between the atoms or molecules of the host part. This causes partial release of the radioactive material as the temperature of the part increases. I have found it preferable to use gaseous radioactive materials, such as the radioactive inert gases. By mounting one or more radiation detectors either within the machine or adjacent to exhaust lines leading from the engine. I immediately detect loss of radioactive material from any one of the critical parts and provide an alarm indication advising operating personnel of an unsafe operating condition.

In a specific embodiment. I diffuse an inert fast-dispersing gaseous type such as krypton or argon into the part to be monitored. I further precondition each part by temperature relieving it to a critical temperature somewhat less than the temperature at which it will fail. This step is accomplished, prior to installation of the part, by raising its temperature to the critical temperature to release some of the diffused krypton. When no further krypton is released, the part is cooled back to room temperature and installed in the machine. No further krypton will be released until the temperature of the part rises above the critical temperature. A discussion of this kryptonating technique may be found in reports by David Chleck et al., entitled, "Development of Krypton 85 As A Universal Tracer," dated Mar. 26, 1962 and Nov. 1, 1963. Also, a Technical Report AFML-TR-65-66 written by Philip Goodman et al., entitled "Use of Kryptonate in Materials Research" describes the theory of the kryptonating technique in some detail. Whenever krypton is detected, the critical temperature of one of the machine parts has been exceeded and a signal is provided. I further provide a protection system responsive to the detector signal for automatically controlling the operation of the machine. This precludes any catastrophic failure of the machine and by alleviating the excessive temperature condition allows the faulty part to be replaced before operation is resumed.

OBJECTS OF THE PRESENT INVENTION

Accordingly, I provide an improved method and means for determining the unsafe operation of a machine.

It is another object of the present invention to provide a system for prohibiting the operation of a machine in an unsafe condition.

It is also an object of the present invention to provide a warning and control system that monitors all critical machine parts for incipient failure due to heating regardless of their location.

It is still another object of the present invention to provide a warning and control system that does not require a plurality of sensors in contact with the machine parts being monitored.

It is yet another object of the present invention to provide a more sensitive temperature warning and control system having substantially no thermal lag.

It is an additional object of the present invention to provide a warning and control system easily adaptable to machines already in existence.

DESCRIPTION OF THE FIGURES

FIG. 1 is a diagrammatic view of a machine temperature monitoring system constructed in accordance with the present invention;

FIG. 2 is a block diagram of a temperature relieving process used to precondition a critical machine part;

FIG. 3 graphically illustrates the correspondence between machine part activity and temperature, occurring in the process shown in FIG. 2; and FIG. 4 is a diagrammatic view, partly in section, of a warning and control system for a typical jet engine.

DESCRIPTION OF THE PRESENT INVENTION

With reference now to the drawings, my monitoring system is shown in connection with a machine 10 having a part 12 subject to excessive wear. The machine 10 may be any mechanical device for modifying, converting or utilizing mechanical energy such as a motor, a pump, generator or gear train. These devices contain a number of parts such as rings, gears, bushings and bearings which must contact other parts to accomplish the required conversion of energy. Eventually this contact results in a wearing away of the part. Its temperature rises because of frictional heating and the overall performance of the machine suffers a gradual degradation.

For each part there is a maximum temperature limit at which it will fail. Of course, the machine is designed so that none of its component parts operate near their respective temperature limits. I provide a monitoring system including a detector 14 and a temperature alarm unit 16. The detector 14 may be located outside the machine 14 and still provide a signal on line 18 whenever the temperature of the machine part 12 exceeds a critical temperature $T_c$ selected in the range between its normal operating temperature and its failure temperature $T_f$.

This temperature threshold is established by incorporating interstitially a radioactive material into the machine part 12 and temperature relieving it as illustrated in FIGS. 2 and 3.

Referring now to FIGS. 2 and 3, this technique is referred to as a kryptonation process when radioactive krypton 85 is used. Other radioactive gases or materials of alpha, beta or gamma emitters may be used with substantially equal utility. The radioactive krypton is incorporated into the part 12 by either of two known techniques, diffusion or bombardment. These techniques are described in detail in the two reports cited above.

After a period of time, the part 12 absorbs a certain amount of krypton and has a fixed activity $A_o$. This resident activity of the part 12 changes with temperature. As the temperature is increased, some of the absorbent gas is released. As a result, the resident activity is a sharp inverse function of the temperature of the part. To temperature relieve the part 12, I heat it up to the critical temperature $T_c$ gradually as shown in FIG. 3. The relieving may be done in two steps at times $t_1$ and $t_2$ whereby the activity is lowered because of degassing denoted by the curvilinear lines 20. When held at a constant temperature, it is noted that no further degassing occurs and the activity of the part 12 remains substantially constant. I cool the part 12 down to room temperature as shown in FIG. 2 and no further release of the krypton will occur until the critical temperature is later exceeded. For example, at a later time $t_3$, if the temperature exceeds $T_c$, more krypton is released as denoted by the curvilinear line 21.

OPERATION OF THE PRESENT INVENTION

The cooled part 12 is installed in the machine 10. During the operation of the machine 10, should the temperature of the part 12 ever reach the critical temperature $T_c$, some krypton gas is immediately released and will permeate the interior of the machine 12. The detector 14 is responsive to nuclear radiation and is mounted to detect the release krypton by sensing the radiation emitted thereby. The detector can be mounted inside the machine 10 provided there is room and it can be located in the most probable path to be taken by the krypton being released from the part 12. Due to the rapid diffusion of the krypton, the detector 14 generates a signal substantially at the same instant the critical temperature is exceeded. The signal triggers the alarm 16 which can be a buzzer, light or other indicator for warning operating personnel. The operation of the machine can be manually controlled, for example, by decreasing its speed, before the failure temperature $T_f$ is reached.

The radiation detection and signal processing equipment may be constructed as follows: The detector 14 may be a G-M tube, ionization chamber or a scintillation crystal and photomultiplier tube. Alternatively, semiconductor devices may be used. In any case, these devices provide signal voltages or currents in analog or pulse form whose amplitude level or count rate can be correlated to the intensity of the radiation being sensed. Depending on the type of detector employed, the detector signal can be clipped, shaped and integrated to provide a D.C. level, for example, which can be electronically compared in a threshold circuit with a reference or target potential indicative of a "zero krypton" condition. Usually there will be some background radiation count, resulting from cosmic and other external radiations, that can be eliminated by adjusting the amplitude of the target potential. Alternatively, energy discrimination techniques can be employed to prevent a false alarm that might otherwise result from the detection of radiation energy of a wavelength different from that of the krypton to be measured.

The electronic threshold circuitry can be coupled to actuate a relay to switch on the alarm 16 whenever krypton is detected. In some cases, it may be desirable to incorporate time delay expedients which insure the energization of the alarm 16 only when the krypton is detected for a fixed period of time.

AUTOMATIC CONTROL SYSTEM

In this embodiment, I provide a method and means for automatically controlling the operation of the machine when one of its component parts is operating beyond its normal operating temperature. This feature is particularly important when an expensive high performance engine, such as the jet engine 22 shown in FIG. 4, must be protected from failure. This type of engine is designed to operate at high speeds where failure of a bearing, for example, if not detected quickly, may result in loss of the entire engine 22.

The engine 22 includes an exhaust section 24, a gas turbine 26, a burner section 28, and a compressor 30 positioned axially along a common shaft 32 extending down the engine. These high speed components are coupled to an output shaft 34 by a planetary gear reducer 36. The reducer 36 may contain an epicyclic or planetary gear train to reduce the speed of the output shaft 34 to about one-tenth the speed of the shaft 32. The output shaft 34 may also be provided with a set of bearings 38 where it exits the housing of the engine 22. The output shaft 34 is used to drive a propeller 40 mounted outside the nose of the engine 22.

To lubricate the engine 22, oil is transmitted from a tank 42 by a pump 44 to a supply manifold (not shown for purposes of clarity). The manifold distributes the oil under pressure to the rotating members and bearings mounted throughout the engine. Scavenge oil from the bearing voids is collected and returned by a scavenge oil pump 46 to the oil tank 42. For simplicity, only one scavenge oil conduit 48 is shown returning oil from the planetary gear housing 36 and associated output shaft bearing 38. For aeration, an oil vapor line 50 runs from the oil tank 42 to the nose case 52 of the engine 22. An overboard vent line 54 extends to the atmosphere from a breather connection 56 mounted on top of the nose case or transmission housing 52.

While all of the engine bearings are subject to failure, those located in the planetary gear housing 36 are most susceptible. This is especially true of the sleeve bearings associated with the high-speed pinion gear sets which are carried around the axis of the engine. Deterioration of these critical items usually causes a catastrophic engine failure.

To detect an imminent engine failure, I kryptonate the critical pieces such as shafts, pulleys, gears and bearings. I temperature relieve them to their respective critical temperatures which may be quite different from one another, depending on their construction. Wear of a critical component may cause a rise in its temperature above the critical value which releases krypton gas into the nose case section occupied by the planetary reduction gear unit 36 and the shaft bearing 38.

Since the released gas is radioactive, its presence may be detected by a radiation detector 60 positioned adjacent to the overboard vent 54. The detector 60 may respond to the beta radiation emitted by the released krypton. Other detectors can be used if gamma or alpha-emitting source materials are diffused into the critcal parts when they are preconditioned. An amplifier 62 may be used to amplify the signal generated by the detector 60. An excessive temperature warning unit 64 may be used to indicate whether a "hot" temperature condition exists in the output section of the engine 22. The signal provided by amplifier 62 may cause the warning unit 64 to switch from a "normal" indication when krypton is detected in the overboard vent 54. The pilot is warned thereby of the danger of continued operation of his engine. The same signal may also be used to control the operation of the engine 22 automatically. For this purpose, an automatic shut-off device 66 may be provided. Depending on the type of engine, the shut-off device 66 can be used to control a fuel valve, disrupt an ignition circuit or apply some sort of braking action. In the illustrated case, it is preferable to actuate a propeller control unit 68 to feather the propeller 40 and stall the engine 22.

OPERATION OF AUTOMATIC CONTROL EMBODIMENT

Before the engine is assembled, all of the critical parts are preconditioned. For example, the bearing 38 is kryptonated and temperature relieved according to the method shown in FIG. 2. It may be set to degas at, say 400° Fahrenheit. Bearings in the planetary reduction unit 36 may be preconditioned to degas at the same critical temperature or higher. The engine 22 is assembled with the kryptonated parts and the detector 60 is mounted on the overboard vent 54.

As the engine is started, air rushes in through the inlet scoops 70 and into the compressor section 30. A fuel mixture is burned in the combustion chamber 28 to drive the gas turbine 26, and combustion products are expelled through the exhaust 24. The shaft 32, turning at a relative high speed, is coupled to the output shaft 34 by the planetary reduction gear section 36.

During the operation of the engine 22, oil is circulated through the transmission housing 52 by the oiling system. Assume for one reason or another that the bearing 38 begins to wear after a thousand hours of use. Its temperature begins to rise toward the critical temperature of 400° F. As soon as it reaches this limit, krypton gas 72 begins to escape from the surface of bearing 38 and to diffuse quickly into the surrounding volume. The gas 72 may travel directly out the vent 54 or it may be absorbed by the oil used for lubrication. In either event, the detector 60 will generate a signal due to the presence of krypton in the vent carried up the vent either traveling directly from the bearing 38 or returned indirectly through the scavenge oil system and oil vapor line 50. The hot temperature light on the excessive temperature unit 64 lights and the automatic engine shut-off unit 66 causes the propeller blade angle to increase which effectively stalls the engine. Fuel starvation and other shutdown procedures can be followed in accordance with normal operating procedures. Of course, the automatic engine shut-off system would normally not be employed except on multi-engined aircraft.

After the engine has stopped, it can be dismantled. The defective bearing 38 can be replaced. If wear is not visible or otherwise detectable on any of the bearing members, all should be replaced.

ALTERNATIVE EMBODIMENTS

A second detector 74 mounted on the scavenge oil line 76 can be used in place of, or in combination with, the vent detector 60. In some cases, it may be more desirable to mount a detector on the oil vapor line 50. Alternatively, a detector may be mounted on the surface of the nose casing 52 or inside thereof, provided space is available. In general, the radiation detector may be positioned in any convenient location where the released krypton is most likely to pass by. With other types of engines, it may be more desirable to monitor the exhaust gases for the presence of krypton, since it will not combine with other materials because of its inert nature. Some difficulty may arise in attempting to monitor the oil and exhaust systems due to self-absorption of the radiation in the carrier medium.

In addition to the above alternatives, different techniques can be used to interdict the normal operation control of the engine 22. Relays or servomechanisms can be provided to effect the desired immediate shutdown of the engine.

SUMMARY

My system is capable of monitoring the temperature of normally inaccessible engine parts for the purpose of detecting imminent failure thereof. It is capable, by judicious positioning of a single detector, of monitoring a large number of parts simultaneously. Manual or automatic control of the engine's operation may be provided by utilizing the signals derived by my novel temperature measuring monitor. As a result of the quick response provided by my invention, the integrity of high performance engines such as the axial flow turboprop example is preserved.

While the present invention has been described with reference to a preferred embodiment, it should be understood that certain changes, additions, and omissions may be made therein without departing from the spirit and scope of the present invention or sacrificing any of its attendant advantages.

I claim:
1. The method for determining the unsafe operation of a machine having at least one part which may fail when operated above a predetermined temperature comprising the steps of:
   in corporating a radioactive gas interstitially within said part;
   temperature relieving said incorporated part to said predetermined temperature which is above the normal operating temperature of said part and near and below the temperature at which said part fails,
   mounting said temperature relieved part in said machine, and
   detecting subsequent release of said radioactive gas from said machine part during the operation of the machine to provide a signal indicative of the operation of said part at temperatures in excess of said predetermined temperature.

2. The method as set forth in claim 1 further including the step of controlling the operation of said machine whenever said radioactive gas is detected to alleviate said excessive temperature condition.

3. The method for determining the unsafe operation of a machine having at least one moving part which may fail when operated above a predetermined temperature, said method comprising the steps of:
   kyrptonating said moving machine part;
   temperature relieving said kryptonated part to said predetermined temperature which is above the normal operating temperature of said part and near and below the temperature at which said part fails;
   mounting said temperature relieved part in said machine;
   measuring subsequent release of krypton from said machine part during the operation of said machine to provide a signal indicative of the operation of said part at temperatures in excess of said predetermined temperature; and utilizing said signal as a warning to prevent the further operation of said machine in said unsafe condition.

4. Apparatus for sensing the unsafe operation of a machine having at least one moving part which may fail when operated above a predetermined temperature, said part having a radioactive gas incorporated interstitially therein and being temperature relieved to said predetermined temperature which is above the normal operating temperature of said part and near and below the temperature at which said part fails, said apparatus comprising:

means for detecting subsequent release of said radioactive material from said part during operation of said machine to provide a signal indicative of the operation of said part at temperatures in excess of said predetermined temperature.

5. Apparatus as set forth in claim 4 which further includes means controlled by said detecting means for stopping the operation of said machine whenever said radioactive gas is detected.

6. In an apparatus for indicating the unsafe operation of a machine having at least one bearing member which may fail when operated above a predetermined temperature, said bearing member having an inert radioactive gas incorporated interstitially therein and being further temperature relieved to said predetermined temperature which is above the normal operating temperature of said part and near and below the temperature at which said part fails, the improvement comprising:

detector means for detecting loss of said radioactive gas from said bearing member during the operation of said machine as a result of an excessive operating temperature, and means responsive to said detected loss of radioactive gas for indicating said excessive temperature condition.

7. In an apparatus for preventing the unsafe operation of a machine having at least one bearing member which may fail when operated above a predetermined temperature, said bearing member having an inert radioactive gas incorporated interstitially therein and being further temperature relieved to said predetermined temperature which is above the normal operating temperature of said part and near and below the temperature at which said part fails, the improvement comprising:

detector means for detecting loss of said radioactive gas from said bearing member during the operation of said machine as a result of an excessive operating temperature, and control means responsive to said detected loss of radioactive gas for automatically controlling the operation of said machine to alleviate said excessive temperature condition.

8. An automatic warning system for a high speed jet engine having a gear reducer section for controlling the speed of an output shaft relative to an input shaft, said system comprising:

a plurality of kryptonated bearing means movable relative to said shafts, each of said bearing means being temperature relieved to a temperature less than the temperature at which it will fail and substantially above its normal operating temperature, and radiation detector means for detecting the release of krypton from any of said bearing means during the operation of said machine to provide an indication of an excessive temperature condition within said engine.

9. An automatic protection system for a high speed jet engine having a gear reducer section for controlling the speed of an output shaft relative to an input shaft, said system comprising:

a plurality of kryptonated bearing means movable relative to said shafts, each of said bearing means being temperature relieved to a temperature less than the temperature at which it will fail and substantially above its normal operating temperature, and a housing for enclosing said bearing means in an oil bath and having an air vent, radiation detector means for detecting the presence of krypton released from said bearing means during the operation of said engine and carried in said oil bath or said air vent and providing a signal indicative thereof, and means for utilizing said signal to automatically control the operation of said engine to prevent damage resulting from an excessive temperature condition within said engine.

10. A protection system as set forth in claim 9 further including means for automatically stopping said engine.

11. A method for determining the unsafe operation of a machine having component parts which may fail when operated above a predetermined temperature comprising the steps of incorporating a radioactive gas interstitially within one or more of said parts;

temperature relieving said part to said predetermined temperature substantially above normal operating temperature for said respective part to release a quantity of said radioactive gas until no further said gas is released at or below said predetermined temperature;

mounting said temperature relieved part in said machine; and operating said machine under normal conditions; and detecting the presence of additional released said radioactive gas from said part to provide a signal that said part has been operated at a temperature in excess of said predetermined temperature and that said respective part may fail.

12. The method of claim 11 further including the step of controlling the operation of said machine whenever said radioactive gas is detected to alleviate said excessive temperature condition.

13. The method of claim 11 wherein said radioactive gas is radioactive krypton gas.

14. Apparatus for detecting the unsafe operation of a machine having component parts which may fail when operated above a predetermined temperature comprising at least one of said parts having a radioactive gas incorporated interstitially therein and being temperature relieved to said predetermined temperature substantially above normal operating temperature for said respective part to release a quantity of said radioactive gas until no further said gas is released at or below said predetermined temperature;

operating said machine under normal conditions;

means for detecting the presence of additional released said radioactive gas from said one part to provide a signal indicative of the operation of said part at a temperature in excess of said predetermined temperature and that said part may fail.

15. The apparatus of claim 14 wherein said temperature relieved part is so mounted within said machine that it will release said radioactive gas into a fluid medium when its temperature is raised above said predetermined temperature, and wherein said detecting means is positioned to monitor said fluid medium for the presence of said released radioactive gas.

16. The apparatus of claim 14 wherein a plurality of component parts are each temperature relieved to a predetermined temperature above which said part may fail; and wherein a single detecting means is positioned to sense the present of additional released radioactive gas from any one of said plurality of parts.

17. The apparatus of claim 14 further including a means controlled by said detecting means for stopping the operation of said machine whenever additional radioactive gas is detected.

18. The apparatus of claim 14 wherein said machine is a jet engine and wherein said apparatus includes means responsive to the output of said detecting means for controlling automatically the operation of said engine to prevent damage thereto resulting from an excessive temperature condition.

19. The apparatus of claim 14 wherein said machine part is a bearing member.

References Cited

UNITED STATES PATENTS 2,692,951  10/1954  Voelker.
2,811,650  10/1957  Wagner.
2,938,125  5/1960   Marak.
3,291,986  12/1966  Lamb.

OTHER REFERENCES

Kryptonates: KR[85] Becomes a Universal Tracer by Chleck et al., from Nucleonics, vol. 21, No. 7, July 1963, pp. 53, 54, 55.

Development of Krypton-85 as a Universal Tracer, Continuation of Phase III. Areas of Application, by Chleck et al., Nov. 1, 1963, NYO-2753-3, title page iii, iv, 78 to 84.

ARCHIE R. BORCHELT, Primary Examiner

U.S. Cl. X.R.

250—106